United States Patent
Lo et al.

[19]

[11] Patent Number: 5,825,466
[45] Date of Patent: *Oct. 20, 1998

[54] 3D PHOTO PRINTER WITH IMAGE DISTORTION CORRECTION

[75] Inventors: Allen Kwok Wah Lo, Dunwoody, Ga.; Kenneth Quochuy Lao, Westfield, N.J.

[73] Assignee: Image Technology International, Inc., Norcross, Ga.

[*] Notice: The term of this patent shall not extend beyond the expiration date of Pat. No. 5,583,971.

[21] Appl. No.: 588,134

[22] Filed: Jan. 18, 1996

[51] Int. Cl.$^6$ .......................... G03B 27/32; G03B 27/46; G03B 27/52

[52] U.S. Cl. ............................... 355/33; 355/77; 348/42; 348/51; 348/59; 353/32; 359/463; 396/306; 396/327; 396/330

[58] Field of Search .................................. 355/22, 33, 52, 355/77; 348/42, 450, 51, 59; 353/32; 359/463, 619; 396/306, 327, 330

[56] References Cited

U.S. PATENT DOCUMENTS 3,953,869  4/1976  Wah Lo et al. .......................... 354/112
5,028,950  7/1991  Fritsch ...................................... 355/22
5,192,969  3/1993  Igarashi et al. .......................... 355/22
5,412,449  5/1995  Lam .......................................... 355/22
5,543,873  8/1996  Winnek et al. .......................... 354/112
5,583,971  12/1996  Lo ............................................ 395/117

*Primary Examiner*—Arthur T. Grimley
*Assistant Examiner*—Herbert V. Kerner

[57] ABSTRACT

A photographic printer for making 3D pictures or animation pictures from at least two 2D images on lenticular print material. The printer uses a monitor for sequentially displaying 2D images. A projection lens is used to project the displayed 2D images onto the print material. A tilting mechanism is used to tilt the print material for changing the projection angles. In order to correct for the distortion of images projected on the print material due to tilting, the 2D images are geometrically transformed according to the tilting angles. The same printer can be used to make 2D prints on regular photographic paper. The printer can be equipped with a plurality of projection lenses with different focal lengths so that pictures of different magnification factors can be made.

27 Claims, 17 Drawing Sheets

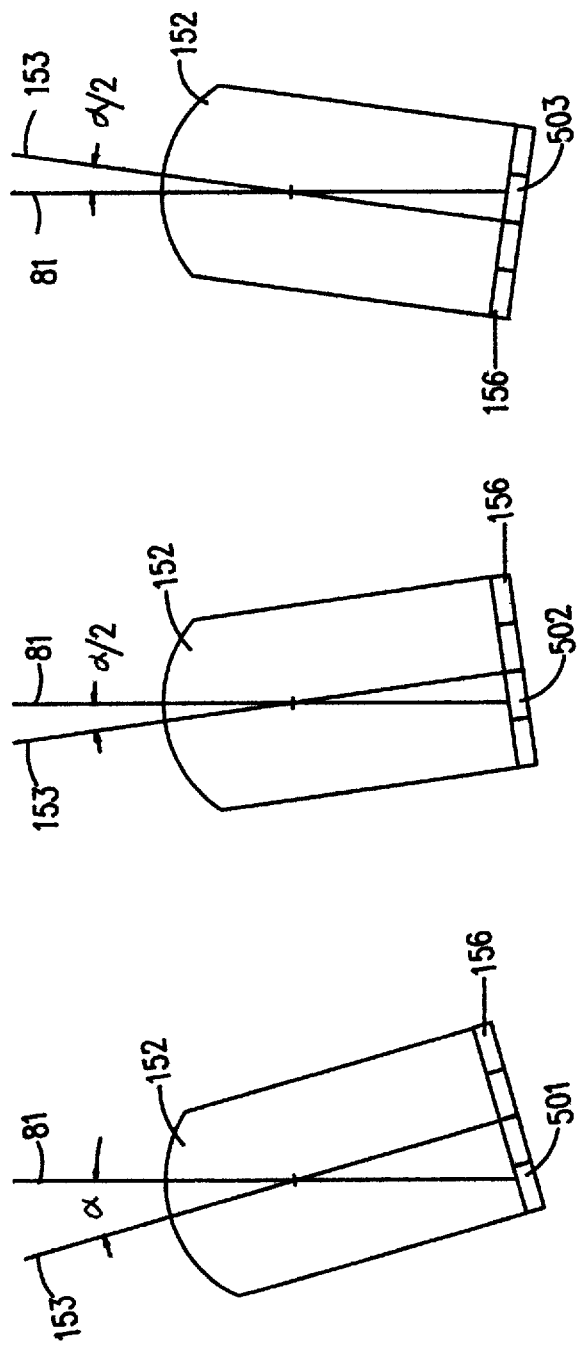

3D PHOTO PRINTER WITH IMAGE DISTORTION CORRECTION

FIELD OF THE INVENTION

The present invention relates generally to a photographic printer, and more specifically a printer for making 3D pictures or animation pictures on lenticular print material.

BACKGROUND OF THE INVENTION

In the making a lenticular-type 3D picture or animation picture, the basic process involves exposing a plurality of 2D images, each at a different projection angle, onto a lenticular print material to form a plurality of line-form images on the photosensitive coating underlying the lenticules of the lenticular print material. It is well-known that, in making a 3D picture of a scene, it is necessary to select a common point in all of the 2D images of the scene as the registration point (also known as the key subject in 3D photography) for aligning these 2D images during exposure. U.S. Pat. No. 5,412,449 (Lam) discloses a single-stage printer for making 3D pictures from 2D images recorded on film; U.S. Pat. No. 5,028,950 (Fritsch) discloses a dual-stage printer for making 3D pictures from 2D images recorded on film. In order to change the projection angles, both Lam and Fritsch move the projection lens and the print material to different positions in relation to the lamphouse in the printer—this is known as the scanning method in 3D photography. In both disclosures by Lam and by Fritsch, the alignment of key subject is accomplished by separately adjusting each the negatives on which the 2D images are recorded. U.S. Pat. No. 5,192,969 (Igarashi et al.) disclosure a printer with a mirror system wherein each of the 2D images is placed at a different position under a lamphouse and projected by a common projection lens onto the print material at different projection angles. In order to avoid moving the print material to different positions, Igarashi uses at least two mirrors to fold the optical path for projecting each 2D image. Furthermore, because the aperture of the projection lens is very small, the line-form images do not properly fill the photosensitive layer area under each lenticule. For that reason, Igarashi uses a rocking system to rock the print material to broaden the line-form images. As for key subject alignment, Igarashi adjusts the mirrors.

Each of the above-mentioned methods requires a printer of high complexity. Furthermore, the projected images on the print material in the printer disclosed by Igarashi are distorted due to the rocking of the print material. It is desirable to provide a lenticular printer which operates on a simple principle yet produces high quality pictures.

SUMMARY OF THE INVENTION

The present invention provides a photographic printer for making 3D and/or animation pictures on lenticular material composing from at least two 2D images. The printer uses a video monitor to sequentially display the 2D images, and a projection lens to project the displayed 2D images onto a lenticular print material. While the relative position between the monitor and the projection lens is fixed, a tilting mechanism is used to tilt the lenticular print material and thus to change the projection angles. In order to correct for the distortion of projected images on the print material due to the tilting, the 2D images are geometrically transformed, or warped, using computer and software before they are displayed on the monitor.

It is the object of the present invention to provide a photographic printer for making lenticular pictures (3D or animation) comprising a monitor for sequentially displaying 2D images for exposure, and a tilting mechanism for changing the projection angle and filling the photosensitive layer underlying the lenticules with optically compressed line-form images.

It is another object of the present invention to correct for the distortion of projected images on the print material due to the tilting thereof by geometrically transforming the 2D images before displaying them for exposure.

It is yet another object of the present invention to provide a photographic printer in which different paper cassettes can be used for storing print materials of different types or sizes, including lenticular print material for making lenticular pictures, and regular photographic paper for making 2D pictures.

It is a further object of the present invention to provide a photographic printer with one or more project lenses for making pictures of different magnifications.

BRIEF DESCRIPTION OF THE DRAWINGS

FIGS. 9A–9D are enlarged cross sections of a lenticule showing the tilting of print material for making a lenticular picture from four 2D images.

DETAILED DESCRIPTION OF THE INVENTION

Figure 1:
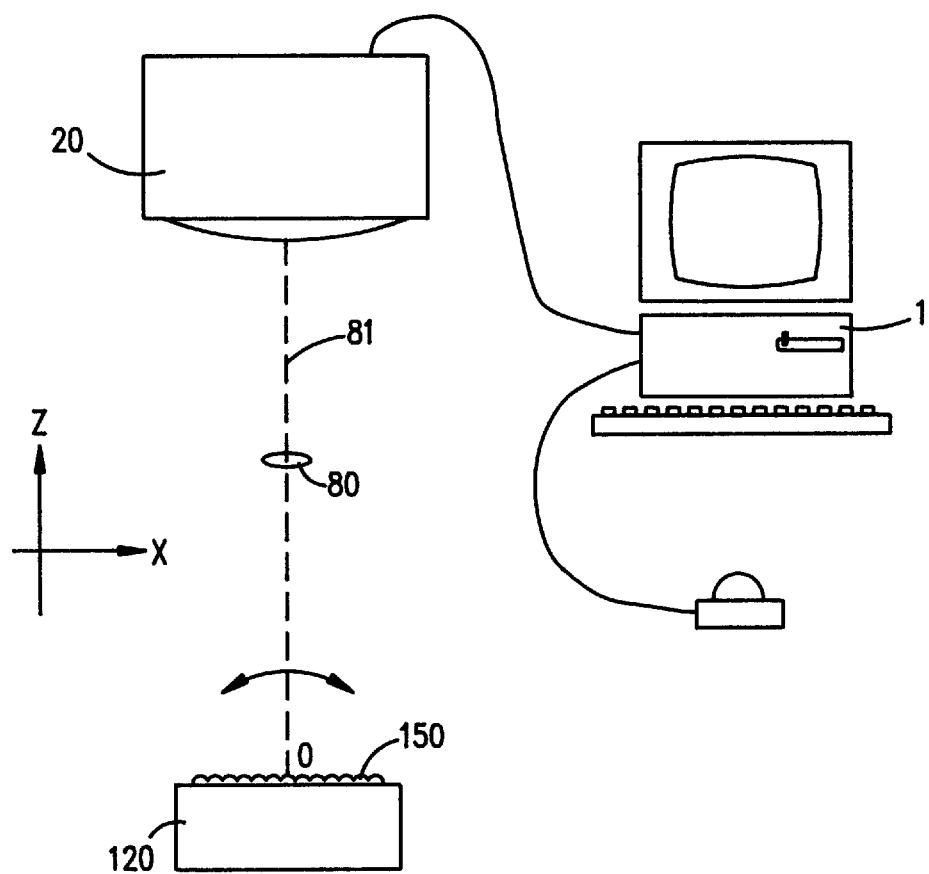
FIG. 1 is a schematic view showing the essential components of the photographic printer.

FIG. 1 shows the essential components of the 3D photographic printer, according to the present invention. As shown in FIG. 1, numeral 1 denotes a computer workstation the functions of which include storing 2D images to be used for making 3D or animation pictures; conveying 2D images to a video monitor 20 for exposure; controlling the tilting mechanism 120; generating computer graphics; and electronically processing images such as geometrically transforming or warping 2D images before the 2D images are displayed on the monitor 20. Numeral 80 denotes a projection lens for projecting the 2D images sequentially displayed on the video monitor 20 to the lenticular print material 150 placed on the tilting mechanism 120. The lenticular print material 150 comprises a contiguous array of lenticules having a common longitudinal axis which is parallel to the Y axis and perpendicular to X and Z axes as depicted in the figure. Numeral 81 denotes the optical axis of the projection lens 80. In order to change the projection angles in relation to the lenticules on the print material 150, the tilting mechanism 120 is tilted at point O on the print material 150 about an axis which is parallel the Y axis. It is understood that the projection lens 80 is placed in a position such that an image displayed on the monitor 20 is properly focused on the print material 150 with a desired magnification. It is also understood that the 2D images are electronically shifted in the computer prior to exposure such that the key subject in each 2D images is properly aligned with each other before being conveyed to the video monitor 20. The 2D images used for making 3D pictures or animation pictures may be acquired by one or more cameras, or they are generated in a computer workstation. If these 2D images are used to make 3D pictures, they must be 2D views of a scene as viewed at different viewing angles. If they are used to make animation pictures, they can be 2D views of different scenes.

Figure 2A:
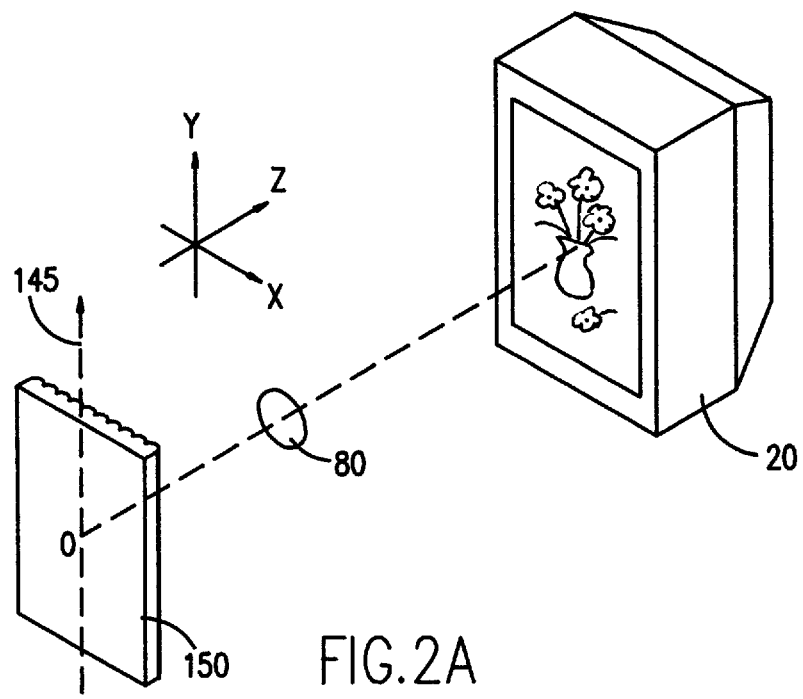
FIGS. 2A and 2B are schematic perspective views showing the different orientations of images displayed on the monitor in relation to the longitudinal axis of the lenticules.
Figure 2B:
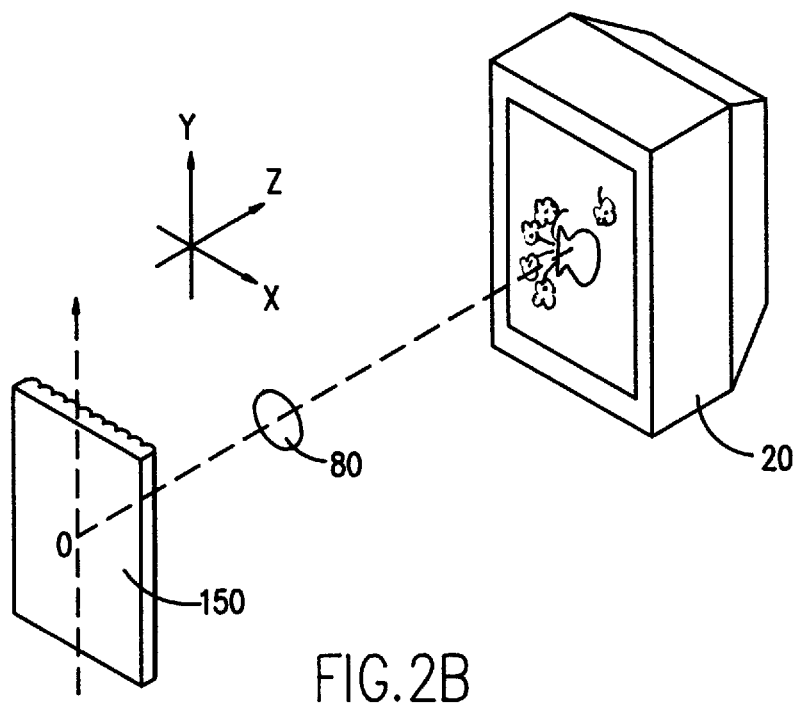

FIGS. 2A and 2B show the orientations of images displayed on the monitor 20 in relation to the longitudinal axis of the lenticules on the lenticular print material 150. Numeral 145 denotes the tilting axis about which the print material 150 is tilted to change the projection angles during exposure. In FIG. 2A, the upright direction of an image displayed on the monitor 20 is parallel to the lenticules, suitable for making 3D pictures and animation pictures. In FIG. 2B, the upright direction of an image displayed on the monitor 20 is perpendicular to the lenticules, suitable for making animation pictures.

Figure 3:
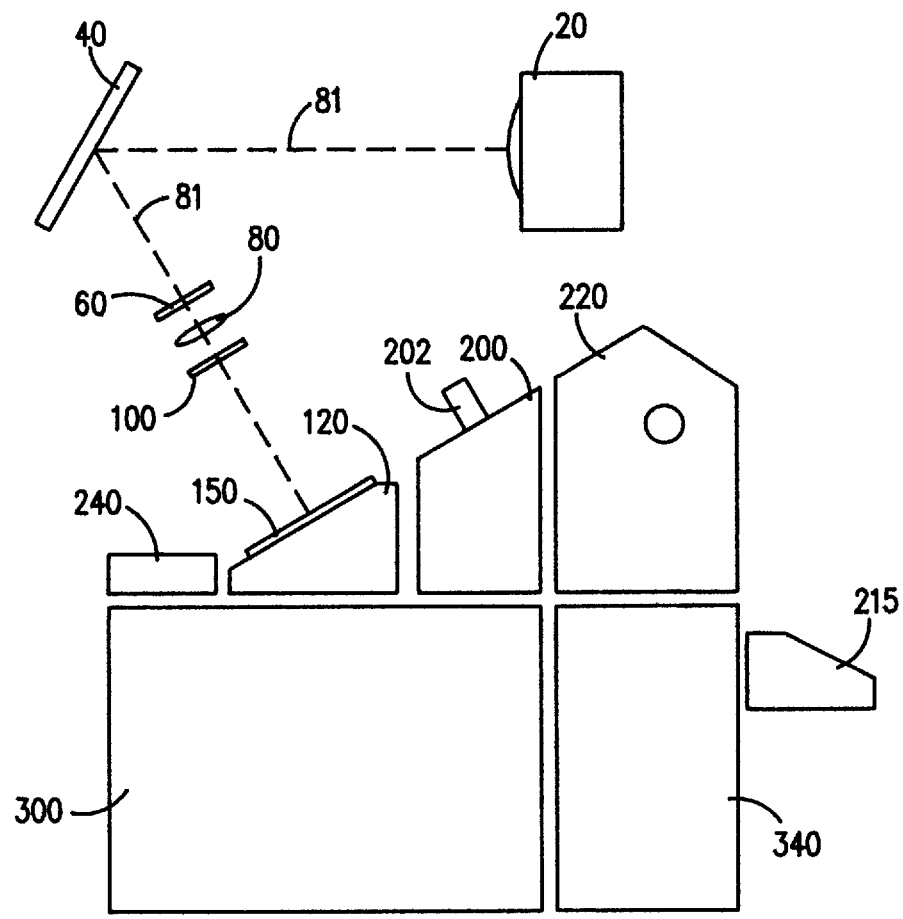
FIG. 3 is a schematic side elevation showing the preferred embodiment of the present invention.

FIG. 3 illustrates the preferred embodiment of the present invention. In FIG. 3, a mirror 40 (preferably a front-coated, plane mirror) is used to fold the optical path of the projection lens 80 for projecting 2D images sequentially displayed on the monitor 20 onto the print material 150. Numeral 60 denotes a shutter which is used to shield the print material from unwanted exposure to light. Numeral 100 denotes a color filter or a group of filters for correcting the color and density of the picture. Preferably, the exposure time for exposing 2D images onto the lenticular print material 150 is controlled by the displayed duration of each image on the monitor 20. Numeral 120 denotes a tilting mechanism which is used to hold the print material 150 in placed during exposure and tilt the print material to change the projection angles. Numeral 220 denotes a paper cassette for storing a roll of the print material. A retrieving means 200 with a cutter 202 are used for retrieving a desired length of print material from the paper cassette 220 for printing. Numeral 240 denotes a disposing means for disposing the print material 150 into a chemical processing unit 300 after the print material is properly exposed. The processed print material is dried by a dryer 340 before it is carried out to a chute 215.

Monitor 20 can be a color monitor or a black-and-white (B/W) monitor. Preferably, each of the 2D images be electronically separated into three color components of red, green and blue so that each 2D image is displayed three times on the monitor each time with a different color component, separately exposed on the print material 150. The density of each of the 2D image may be required to reverse so that the 2D image becomes a negative image for exposure. It is understood that the 2D images are not required to be reversed into mirror images for exposure when mirror 40 is used to fold the optical path. Furthermore, paper cassette 220 may be used to store regular photographic paper for making regular 2D pictures. However, when printing 2D images on regular photographic printing, tilting of the print material 150 is not necessary.

Figure 4:
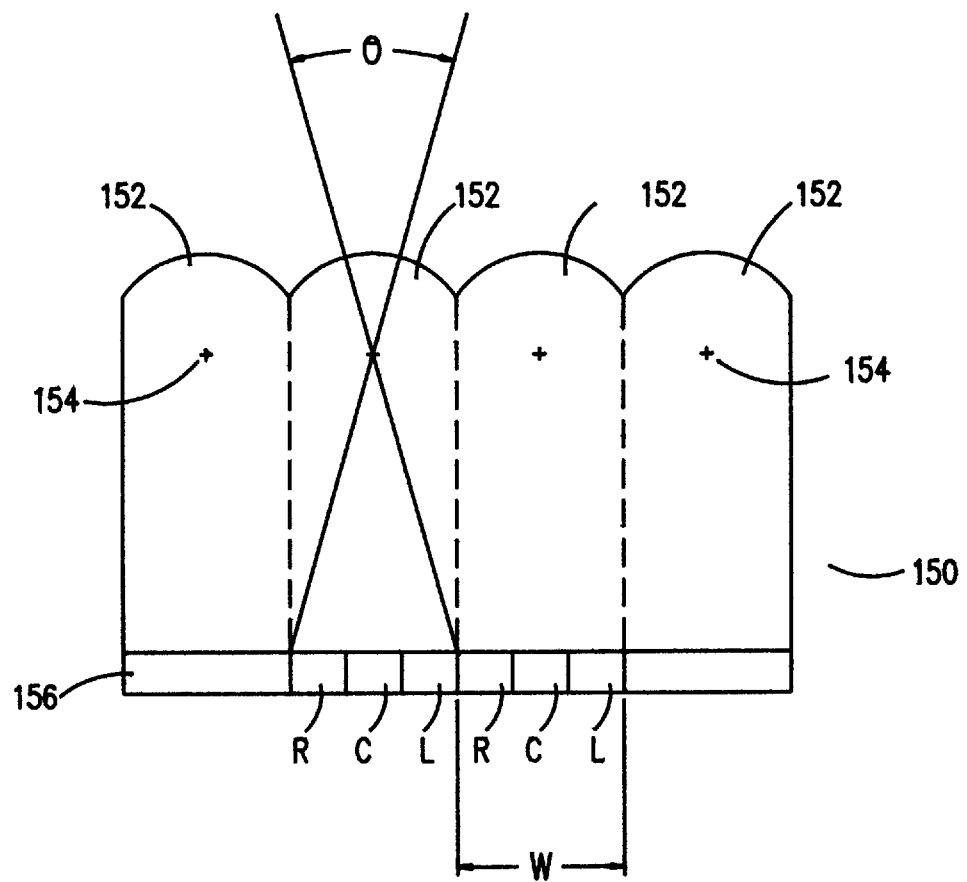
FIG. 4 is an enlarged cross section of a lenticular print material showing the line-form images formed under the lenticules.

FIG. 4 illustrates the optically compressed line-form images formed on the backside of the print material when a number of 2D images are properly exposed. In FIG. 4, numeral 152 denotes the lenticules on the lenticular print material 150. Each lenticule is a cylindrical lens having a radius of curvature the center of which is marked by a cross denoted by numeral 154. Numeral 156 denotes a photosensitive coating on which the line-form images are formed. For illustration purposes only, the 3D picture or animation picture shown in FIG. 4 is composed of three 2D images. Thus, under each lenticule 152 there are three optically compressed line-form images denoted by R, C and L. It is preferred that the aperture of the projection lens 80 is properly adjusted so that the line-form images under each lenticule substantially fill the entire width, w, of each lenticule 152. The total viewing angle of the lenticules is denoted by θ.

Figure 5A:
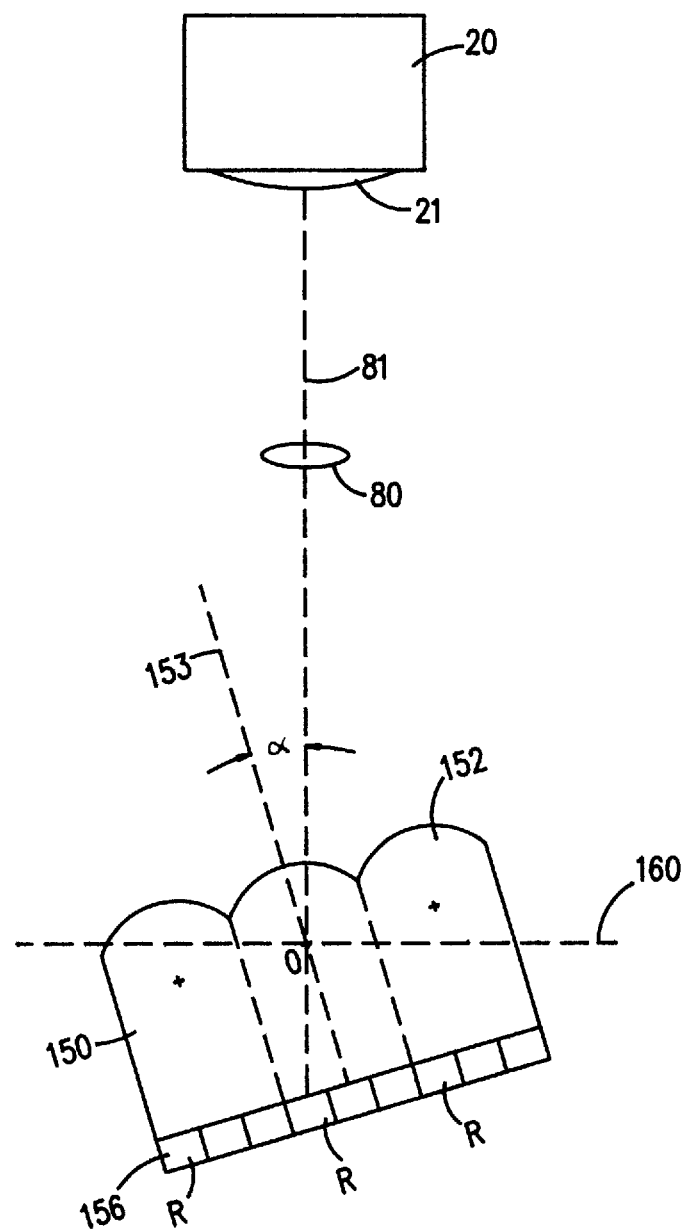
FIGS. 5A–5C are schematic views showing the tilting of the lenticular print material during exposure.
Figure 5B:
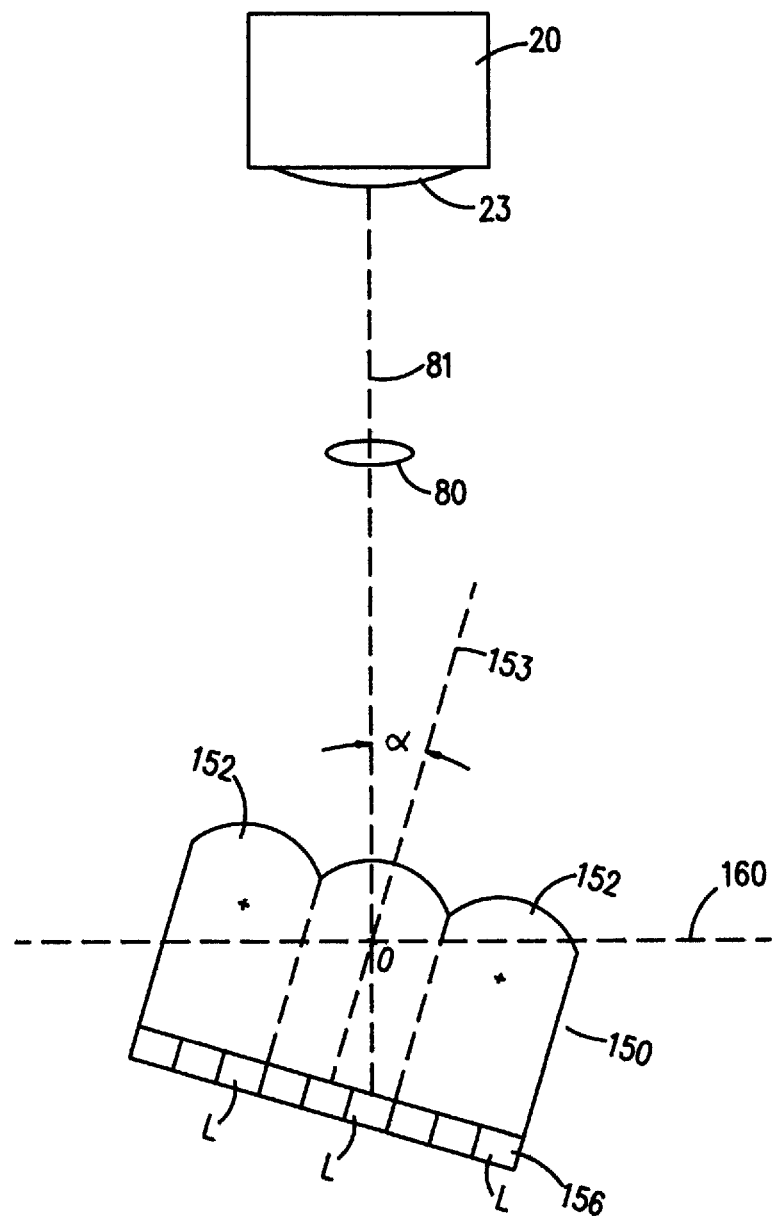
Figure 5C:
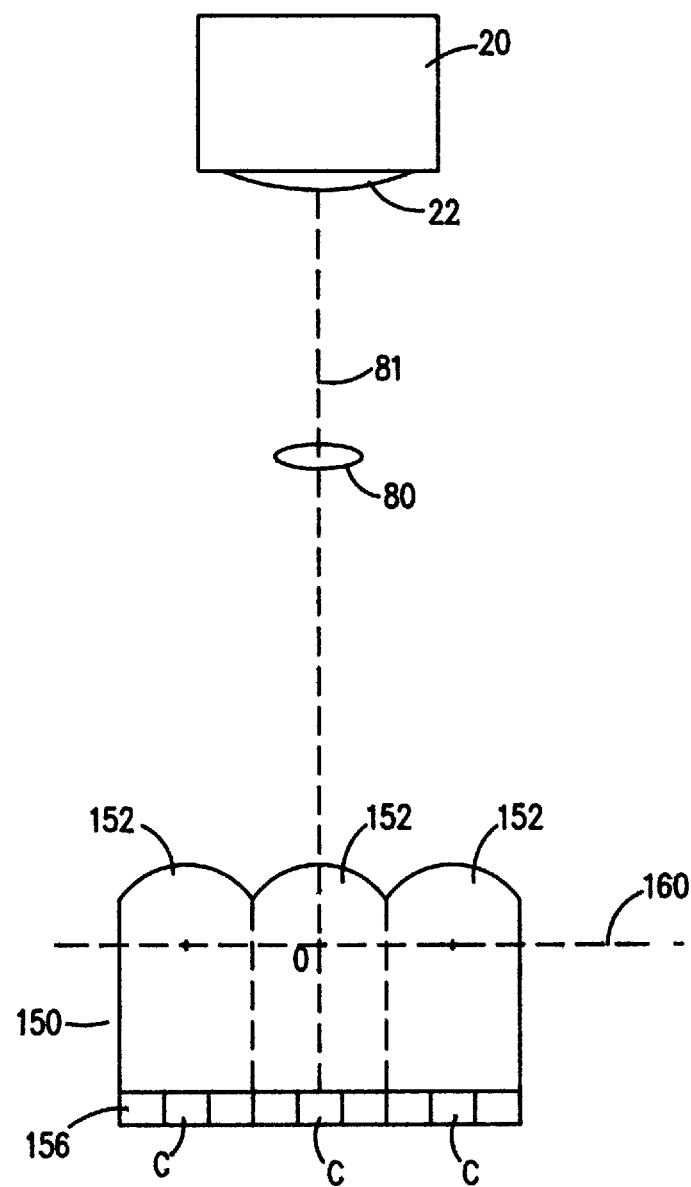

FIGS. 5A–5C show the tilting of the lenticular print material during exposure for making a 3D or animation picture. For illustration purposes only, the picture is composed of three 2D images 21, 22 and 23, sequentially displayed on the monitor 20. FIG. 5A shows the tilting the print material 150 to the left from the image plane 160 by an angle α so that 2D image 21 is optically compressed to form line-form image R on the photosensitive coating 156 under each lenticule 152. Numeral 153 denotes the optical axis of lenticule 152. FIG. 5B shows the tilting the print material 150 to the right by an angle α so that 2D image 23 is optically compressed to form line-form image L on the photosensitive coating 156 under each lenticule 152. FIG. 5C shows that the print material 150 is not tilted but remains in the image plane 60 when the 2D image 22 is exposed to form line-form image C under each lenticule. In FIG. 5A and FIG. 5B, the tilting angle α is equal to θ/3.

Figure 6:
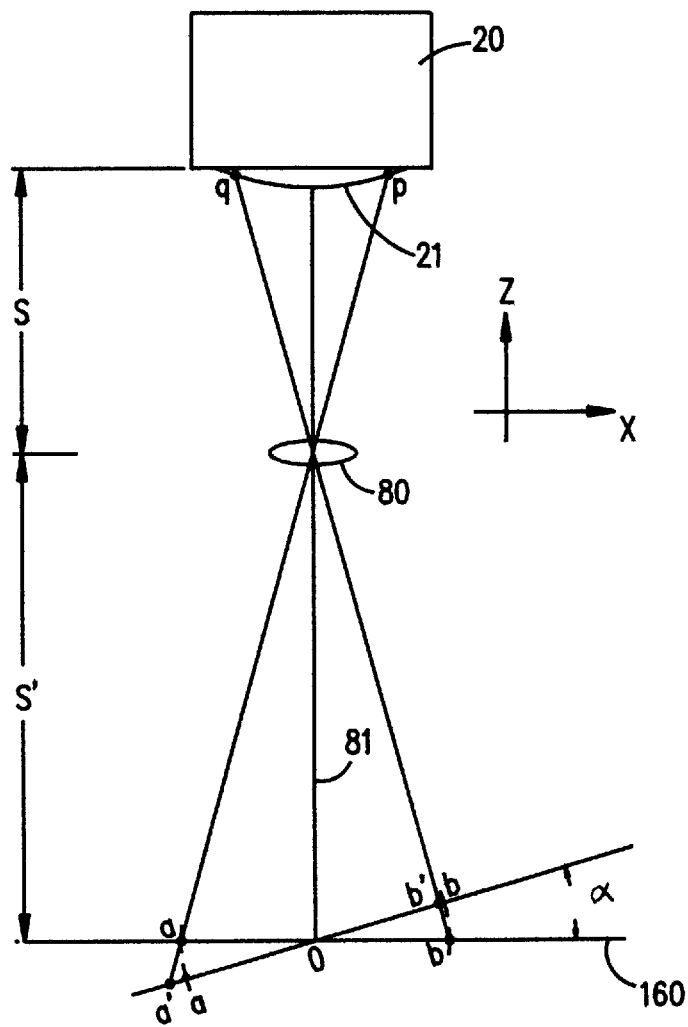
FIG. 6 is a schematic view illustrating the image distortion due to the tilting of the print material.

FIG. 6 illustrates the distortion of the projected images on the print material when the print material is tilted during exposure. In FIG. 6, the print material is tilted to the left from the image plane 160 during the exposure of 2D image 21, displayed on monitor 20 located at the object plane. The object distance and image distance are denoted, respectively, by S and S' with S'/S=M, the magnification factor. It is well-known that the object distance is given by $$S = f(1 + 1/M)$$

where f is the effective focal length of the projection lens 80. As shown in FIG. 6, when the print material is positioned on the image plane 160, points p, q on the image 21 are projected to form images at points a and b, respectively. But when the print material is tilted from the image plane 160 to the left by an angle α, the image of point p is moved outward from point a to a' while the image of point q is moved inward from point b to b'. Thus, the projected image of the print material is distorted due to tilting. In order to correct for the distortion on the projected image, the image at point p must be moved to point p' as shown in FIG. 7A.

Figure 7A:
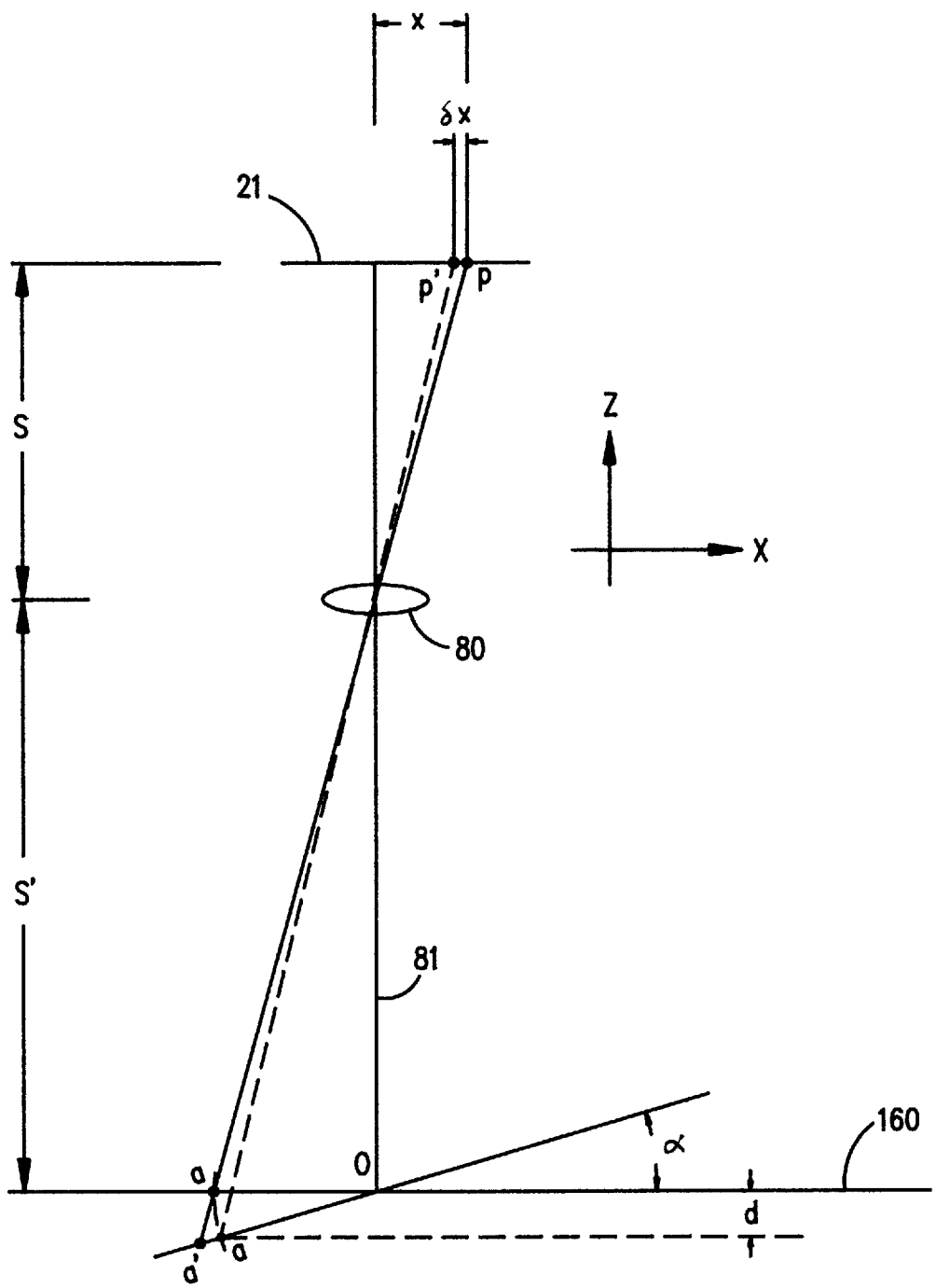
FIGS. 7A and 7B are schematic views showing the geometry of image distortion.

FIG. 7A shows the geometry of image distortion along the X axis. As shown, any point p on the displayed image 21 must be moved to p' so that the same image remains at point a on the print material. If point p is located at a distance x from the optical axis 81, then point p must be moved by a distance δx to p' where δx is given by $$\delta x/x = \{\cos\alpha - 1 - (x/S)\sin\alpha\}/\{1 + (x/S)\sin\alpha\} \qquad (1)$$

It should be noted that the image point a on the print material has moved downward by a distance d when the print material is tilted by an angle α, where d is given by $$d = xM\sin\alpha \qquad (2)$$

Figure 7B:
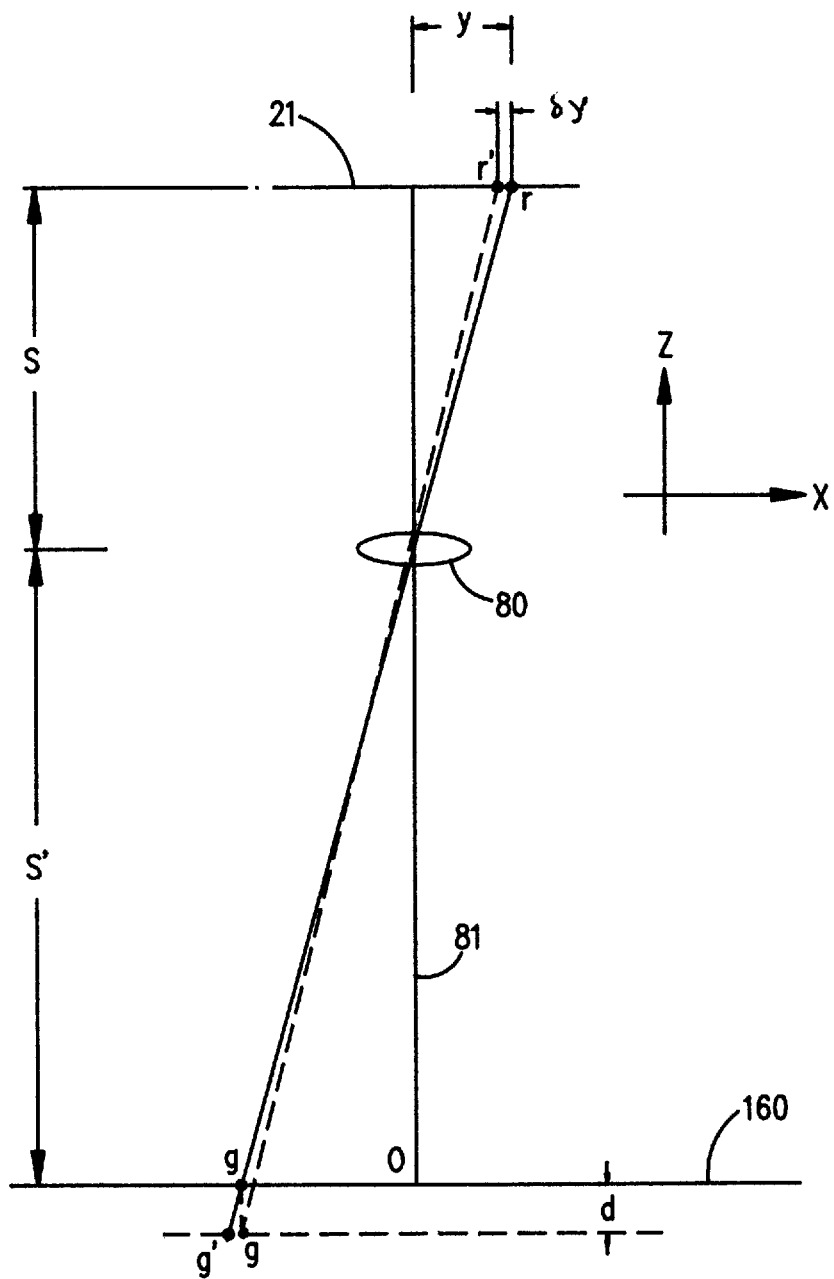

FIG. 7B shows the geometry of image distortion along the Y axis. As shown in FIG. 7B, the image of a point r on image 21 is formed at point g on the image plane 160. If the lenticular print material is tilted away from the image plane such that the same image point on the print material is move downward by a distance d, the image of point r is moved from g to g'. If point r is located at a distance y from the optical axis 81, then point r must be moved by a distance δy to r' in order to correct for the image distortion, where $$\delta y/y = -d/S' \qquad (3)$$
$$= -x\sin\alpha/S$$

In summary, when a 2D image is projected onto the print material 150 which is located at a tilted position, the 2D image must be geometrically transformed, or warped, before it is displayed on the monitor 20 for exposure. The warping of the 2D image is such that an image point (x,y) on the 2D image is moved to a point (x',y') where $$x' = x + \delta x$$
$$y' = y + \delta y$$

with δx and 67 y being given by Eq.1 and Eq.3. The warped image is shown in FIG. 8.

Figure 8A:
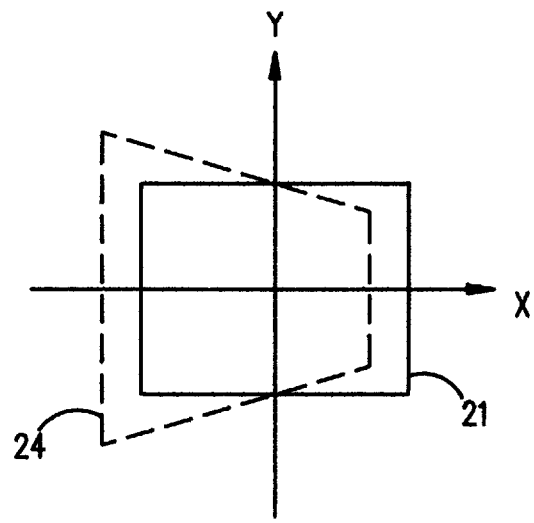
FIGS. 8A and 8B schematic views showing the warping of 2D images displayed on a monitor to correct for the image distortion.
Figure 8B:
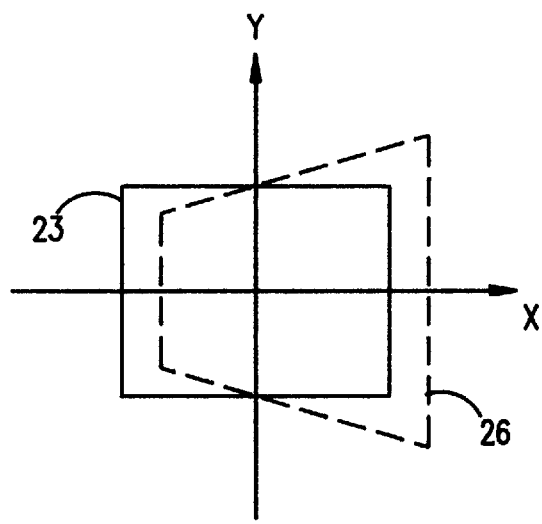

FIGS. 8A and 8B show the warping of 2D images displayed on the monitor 20 in order to correct for the geometrical distortion of the projected image on the print material at a tilted position. FIG. 8A shows the warping of 2D image 21 for correcting for the image distortion when the print material 150 is tilted to the left as shown in FIG. 5A. Numeral 24 denotes the warped image. FIG. 8B shows the warping of 2D image 23 for correcting for the image distortion when the print material 150 is tilted to the right as shown in FIG. 5B. Numeral 26 denotes the warped image.

In the examples illustrated in FIG. 5 where a lenticular picture is composed of three 2D images, the 2D image 22 does not require warping because the print material 150 is not tilted when 2D image 22 is projected thereon.

Figure 9D:
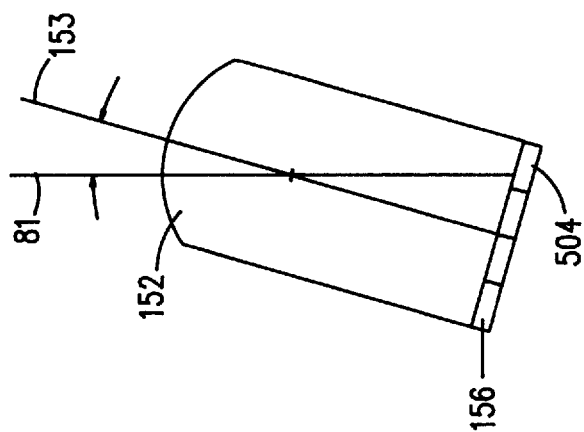

FIGS. 9A–9D show the tilting of print material during exposure for making a lenticular picture composed from four 2D images. As shown, the photosensitive coating 156 is filled with four line-form images 501, 502, 503 and 504 under each lenticule 152. FIG. 9A shows the tilting of the print material to the left by an angle α for forming the line-form image 501, where α=3θ/8. FIG. 9B shows the tilting of the print material to the left by an angle α/2 for forming the line-form image 502. FIG. 9C shows the tilting of the print material to the right by an angle α/2 for forming the line-form image 503. FIG. 9D shows the tilting of the print material to the right by an angle α for forming the line-form image 504.

Figure 10C:
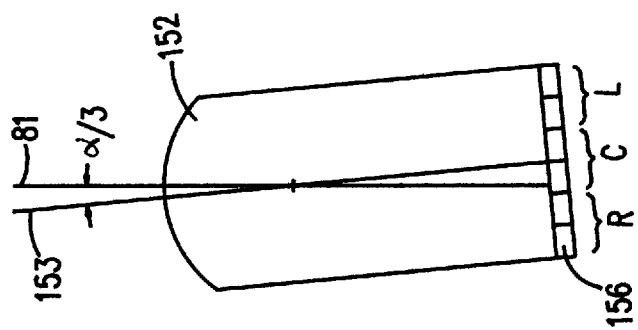
FIGS. 10A–10C are enlarged cross sections of a lenticule showing the tilting of print material for making a lenticular picture from three 2D images but each 2D image is exposed twice.
Figure 10B:
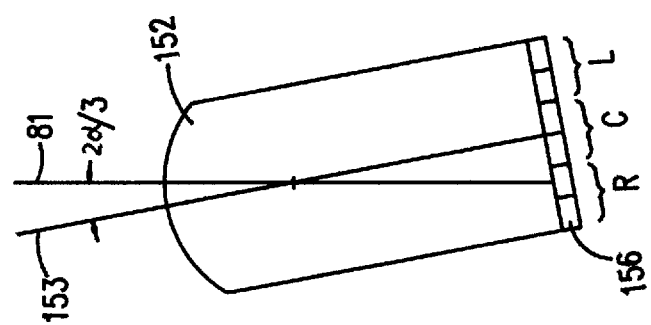
Figure 10A:
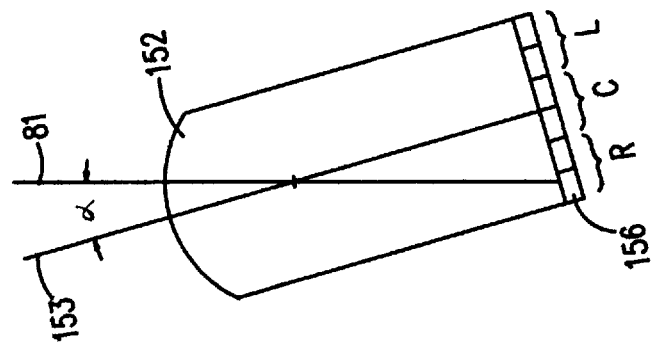

FIGS. 10A–10C show the tilting of print material during exposure for making a lenticular picture composed of three 2D images but the lens aperture is adjusted so that each line-form image can only fill about one-sixth of the photosensitive coating area underlying each lenticule. For example, if three 2D images are used to form line-form images R, C and L on the photosensitive coating 156 underlying each lenticule 152, then each 2D image must be exposed twice. As shown in FIG. 10A, the first 2D image is exposed onto the print material to fill the first half of R when the print material is tilted to the left by an angle α. The same image is exposed again to fill the second half of R when the print material is tilted to the left by an angle 2α/3, as shown in FIG. 10B. Similarly, the second 2D image is exposed to fill the first half of C when the print material is tilted to the left by an angle α/3, as shown in FIG. 10C, and exposed again to fill the second half of C when the print material is tilted to the right at an angle α/3. The tilting of print material for exposing the third 2D image to form the line-form image L is similar to those illustrated in FIG. 10A and FIG. 10B except that the tilting is to the right. In FIGS. 10A–10C, α equals 5θ/12.

Figure 11:
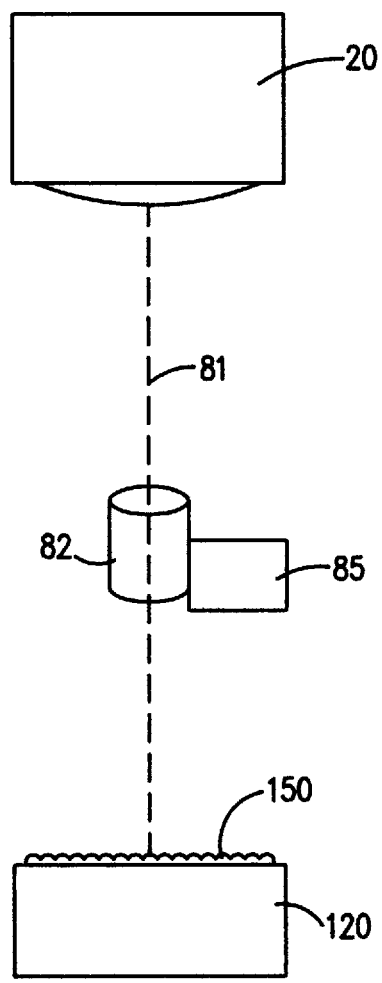
FIG. 11 is a schematic view showing a zoom lens to be used for 2D image projection.

FIG. 11 shows that a zoom lens is used in lieu of a fixed-focus lens 80 for projecting the 2D images displayed on the monitor 20 onto the print material 150. In FIG. 11, numeral 82 denotes a zoom lens which is controlled by a zoom controller 85 to change the magnification factor of the prints.

Figure 12:
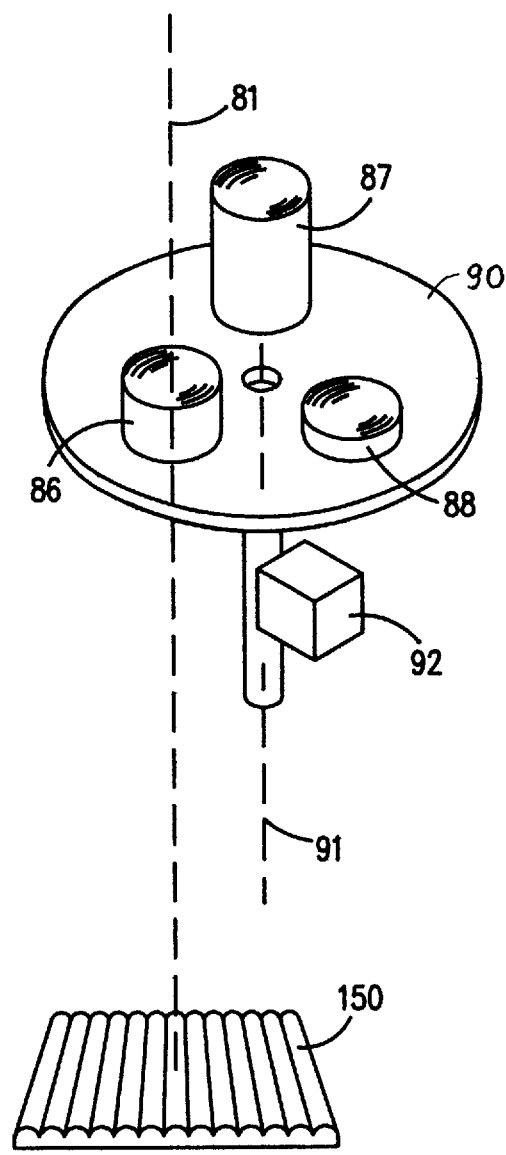
FIG. 12 is a schematic perspective view showing a turret containing a plurality of lenses to be used for image projection.

FIG. 12 shows that a plurality of projection lenses with different focal lengths are used in lieu of the projection lens 80 for printing. In FIG. 12, numeral 90 denotes a turret containing a plurality of lenses 86, 87 and 88. The turret can be rotated about a rotation axis 91 by a rotating means 92 to select one of the lenses for printing. As shown, lens 86 is positioned along the optical axis 81 for projecting the 2D images displayed on the monitor 20 onto the print material 150. It is understood that the number of lenses of the turret can be ranging from two to ten or more.

Figure 13:
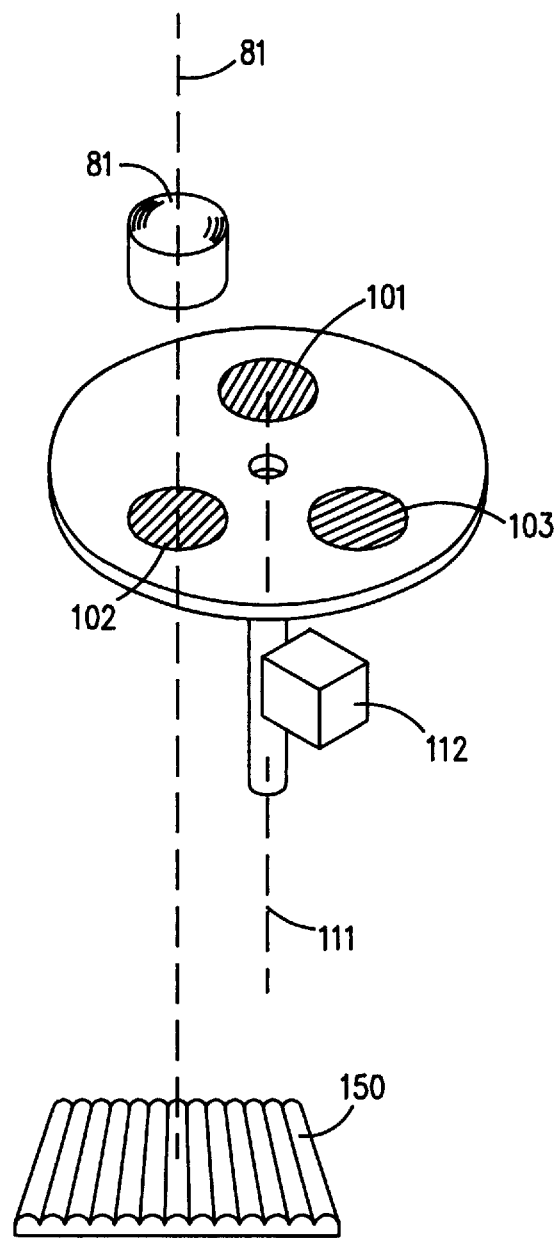
FIG. 13 is a schematic perspective view showing a filter wheel containing three color filters.

FIG. 13 shows a filter wheels used in lieu of the filter 100. In FIG. 13, numeral 110 denotes a filter wheel containing three color filters 101, 102 and 103. 101, 102 and 103 can be a set of red, green and blue filters or a set of cyan, magenta and yellow filters. Each of these filters may be combined with a neutral density filters. The filter wheel 110 can be rotated about a rotation axis 111 by a rotating means 112 to select one of the color filters for printing. As shown, filter 102 is positioned substantially along the optical axis 81 for filtering the image projected through the projection lens 80.

What is claimed is:

1. A method of producing lenticular pictures from a plurality of 2D images on lenticular print material having lenticules wherein said lenticules having a common longitudinal axis, said method comprising the steps of:

a) sequentially displaying said 2D images on a video monitor for exposure;

b) tilting said print material at different tilting angles to change the projection angles; and c) projecting each of said displayed 2D images by a projection lens onto said print material at a different projection angle.

2. The method of claim 1 further comprising the step of d) warping at least one of said 2D images according to the corresponding tilting angle prior to displaying said one 2D image on said video monitor.

3. The method of claim 2 wherein the warping of each of said 2D images is performed such that an image point at point (x,y) on the 2D image is moved to a point (x',y') in accordance with:

$$x'=x+\delta x$$

$$y'=y+\delta y$$

where $$\delta x = x\{\cos\alpha - 1 - (x/S)\sin\alpha\}/\{1+(x/S)\sin\alpha\}$$

$$\delta y = -xy \sin\alpha/S$$

and $\alpha$ is the corresponding tilting angle, S is the object distance of said projection lens.

4. The method of claim 1 wherein the tilting in step (b) is carried out about an axis substantially on said print material parallel to said longitudinal axis of said lenticules.

5. The method of claim 1 further comprising the step of acquiring said 2D images at different viewing angles by at least one camera and storing said 2D images in a computer workstation.

6. The method of claim 1 further comprising the step of generating and storing said 2D images in a computer workstation.

7. The method of claim 1 further comprising the step of separating each of said 2D images into red, green and blue color components wherein each color component is separately displayed on said monitor for exposure.

8. The method of claim 1 wherein the upright direction of said 2D images displayed on said video monitor is perpendicular to the longitudinal axis of said lenticules.

9. The method of claim 1 wherein the upright direction of said 2D images displayed on said video monitor is parallel to the longitudinal axis of said lenticules.

10. A photographic printer for making 3D pictures and/or animation pictures from a plurality of 2D images on lenticular print material wherein said lenticular print material comprises an contiguous array of lenticules having a common longitudinal axis, said printer comprising:

a) a monitor for sequentially displaying said 2D images for exposure;

b) a projection lens for projecting the displayed 2D images on said monitor onto said print material each at a different projection angle;

c) a tilting mechanism for holding and tilting said print material about an axis parallel to the longitudinal axis of said lenticules at different angles to change the projection angles.

11. The printer of claim 10 further comprising means for warping at least one of said 2D images in accordance with the corresponding tilting angle before said one 2D image is displayed on said monitor so that the distortion of a projected image on said print material corresponding to said one 2D image is corrected.

12. The printer of claim 10 wherein the warping of a 2D image is performed such that an image point at point (x,y) on the 2D image is moved to a point (x',y') in accordance with:

$$x'=x+\delta x$$

$$y'=y+\delta y$$

where $$\delta x = x\{\cos\alpha - 1 - (x/S)\sin\alpha\}/\{1+(x/S)\sin\alpha\}$$

$$\delta y = -xy \sin\alpha/S$$

and $\alpha$ is the corresponding tilting angle, S is the object distance of said projection lens.

13. The printer of claim 10 further comprising an image storing means for conveying said 2D images to said monitor for display.

14. The printer of claim 10 further comprising a computer workstation for storing and geometrically transforming said 2D images.

15. The printer of claim 10 wherein said monitor comprises a color monitor.

16. The printer of claim 10 wherein said monitor comprises a black-and-white monitor.

17. The printer of claim 10 further comprising a color filter means.

18. The printer of claim 17 wherein said color filter means comprises a filter wheel having red, blue and green filters.

19. The printer of claim 10 wherein said projection lens comprises a fixed focal-length lens.

20. The printer of claim 10 wherein said projection lens comprises a zoom lens.

21. The printer of claim 10 wherein said projection lens comprises a turret containing at least two projection lens of different focal lengths.

22. The printer of claim 10 further comprising at least one paper cassette for storing and dispensing said lenticular print material.

23. The printer of claim 10 further comprising at least one paper cassette for storing and dispensing regular photographic paper for printing 2D pictures.

24. The printer of claim 10 further comprising a mirror for folding the optical path between said monitor and said lenticular print material.

25. The printer of claim 10 wherein the upright orientation of said 2D images displayed on said monitor is parallel to the longitudinal axis of said lenticules.

26. The printer of claim 10 wherein the upright orientation of said 2D images displayed on said monitor is perpendicular to the longitudinal axis of said lenticules.

27. In a method of producing lenticular pictures from a plurality of 2D images on lenticular print material wherein said 2D images are sequentially displayed on a monitor and projected onto said print material each at a different projection angle, the improvement comprising the step of warping at least one of said 2D images in accordance with the corresponding projection angle before said one 2D image is displayed on said monitor so that the distortion of a projected image on said print material corresponding to said one 2D image is corrected.

* * * * *